US006606652B1

(12) United States Patent
Cohn et al.

(10) Patent No.: US 6,606,652 B1
(45) Date of Patent: *Aug. 12, 2003

(54) SYSTEM FOR TARGETING INFORMATION TO SPECIFIC USERS ON A COMPUTER NETWORK

(75) Inventors: Alan Cohn, New York, NY (US); John L. Adelus, Cupertino, CA (US); Dean Blackketter, San Francisco, CA (US); Samuel Thomas Scott, III, Los Gatos, CA (US); Stephen G. Perlman, Mountain View, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/978,411

(22) Filed: Oct. 16, 2001

Related U.S. Application Data

(63) Continuation of application No. 09/149,404, filed on Sep. 8, 1998, now Pat. No. 6,308,202, which is a continuation-in-part of application No. 09/107,651, filed on Jun. 30, 1998, now Pat. No. 6,237,039.

(51) Int. Cl.⁷ ............................................. G06F 15/16
(52) U.S. Cl. ...................................... 709/217; 709/227
(58) Field of Search ................................ 709/217, 227, 709/203, 224, 245, 238; 705/10, 14, 27, 8, 63; 725/2, 32, 46, 48

(56) References Cited

U.S. PATENT DOCUMENTS 5,305,195 A    4/1994  Murphy ..................... 364/401
5,572,643 A   11/1996  Judson ...................... 395/793
5,659,367 A *  8/1997  Yuen ......................... 248/465
5,675,510 A   10/1997  Coffey et al. ............... 709/224
5,737,619 A    4/1998  Judston ..................... 395/761

(List continued on next page.)

FOREIGN PATENT DOCUMENTS

| EP | 0 749 081 | 12/1996 | ..................... 17/60 |
| JP | 411120109 A * | 4/1999 | ........... G06F/13/00 |
| WO | WO 93/19427 | 9/1993 | ..................... 15/21 |
| WO | WO 96/30864 | 10/1996 | |

OTHER PUBLICATIONS

FGDC, "Details of intstructions for preparing a Data description using the NOAA FGDC Meta data standard template", Jun. 8, 1994, U.S. Geological Survey National Center, 2 pages.*

(List continued on next page.)

Primary Examiner—Bunjob Jaroenchonwanit
(74) Attorney, Agent, or Firm—Workman, Nydegger & Seeley (57) ABSTRACT

A system for targeting information on a computer network. The system involves categorizing a plurality of address pointers according to the content designated by the address pointer. The system further involves reading the address pointer which designates the content received by the user and determining which category or categories, if any, the address pointer is within. Information packets, such as advertisements, are targeted to selected categories. Once the category of an address pointer has been determined, an information packet targeted to that category is selected and transmitted to the user.

14 Claims, 5 Drawing Sheets

U.S. PATENT DOCUMENTS

| | | | | |
|---|---|---|---|---|
| 5,781,879 | A | * | 7/1998 | Arnold et al. ................. 704/9 |
| 5,796,424 | A | * | 8/1998 | Ely et al. ...................... 348/15 |
| 5,796,952 | A | | 8/1998 | Davis et al. ........... 395/200.54 |
| 5,818,439 | A | * | 10/1998 | Nagasaka et al. ........... 345/327 |
| 5,828,837 | A | | 10/1998 | Eikeland ................ 395/200.32 |
| 5,848,396 | A | | 12/1998 | Gerace ........................ 705/10 |
| 5,884,028 | A | | 3/1999 | Kindell et al. .............. 709/234 |
| 5,898,833 | A | * | 4/1999 | Kidder ....................... 709/234 |
| 5,905,492 | A | | 5/1999 | Straub et al. ............... 345/333 |
| 5,913,040 | A | | 6/1999 | Rakavy et al. ......... 395/200.62 |
| 5,929,850 | A | * | 7/1999 | Broadwin et al. .......... 345/327 |
| 5,933,811 | A | * | 8/1999 | Angles et al. ................ 705/14 |
| 5,937,037 | A | | 8/1999 | Kamel et al. ............ 379/88.19 |
| 5,948,061 | A | | 9/1999 | Merriman et al. .......... 709/219 |
| 5,960,429 | A | | 9/1999 | Peercy et al. .................. 707/5 |
| 5,974,398 | A | | 10/1999 | Hanson et al. ................ 705/14 |
| 5,978,381 | A | | 11/1999 | Perlman et al. ............. 370/432 |
| 5,991,735 | A | | 11/1999 | Gerace ........................ 705/10 |
| 6,009,410 | A | | 12/1999 | LeMole et al. ............... 705/14 |
| 6,009,452 | A | | 12/1999 | Horvitz ...................... 709/102 |
| 6,012,075 | A | * | 1/2000 | Fein et al. .................. 707/540 |
| 6,018,619 | A | | 1/2000 | Allard et al. ........... 385/200.54 |
| 6,028,600 | A | | 2/2000 | Rosin et al. ................ 345/327 |
| 6,034,652 | A | | 3/2000 | Freiberger et al. ............. 345/2 |
| 6,047,327 | A | | 4/2000 | Tso et al. .................... 709/232 |
| 6,049,831 | A | * | 4/2000 | Gardell et al. .............. 709/236 |
| 6,061,738 | A | * | 5/2000 | Osaku et al. ............... 709/245 |
| 6,073,167 | A | | 6/2000 | Poulton et al. ............. 709/206 |
| 6,076,093 | A | * | 6/2000 | Pickering ................... 707/104 |
| 6,081,629 | A | | 6/2000 | Browning ................... 382/313 |
| 6,098,069 | A | | 8/2000 | Yamaguchi ................ 707/102 |
| 6,101,549 | A | | 8/2000 | Baugher et al. ............ 709/238 |
| 6,119,098 | A | | 9/2000 | Guyot et al. .................. 705/14 |
| 6,133,912 | A | | 10/2000 | Montero ..................... 345/716 |
| 6,134,584 | A | | 10/2000 | Chang et al. ............... 709/219 |
| 6,144,944 | A | | 11/2000 | Kurtzman, II et al. ......... 705/14 |
| 6,144,973 | A | | 11/2000 | Fujii et al. ............... 707/501.1 |
| 6,154,771 | A | * | 11/2000 | Rangan et al. .............. 709/217 |
| 6,167,453 | A | * | 12/2000 | Becker et al. .............. 709/245 |
| 6,173,316 | B1 | * | 1/2001 | De Boor et al. ............ 709/218 |
| 6,175,862 | B1 | * | 1/2001 | Chen et al. ................. 709/218 |
| 6,184,878 | B1 | * | 2/2001 | Alonso et al. ............... 345/327 |
| 6,185,586 | B1 | | 2/2001 | Judson ....................... 707/513 |
| 6,219,042 | B1 | * | 4/2001 | Anderson et al. ........... 345/716 |
| 6,230,324 | B1 | * | 5/2001 | Tomita et al. ................. 725/51 |
| 6,233,618 | B1 | * | 5/2001 | Shannon ..................... 709/229 |
| 6,240,456 | B1 | * | 5/2001 | Teng et al. .................. 709/230 |
| 6,240,555 | B1 | * | 5/2001 | Shoff et al. ................... 725/51 |
| 6,260,066 | B1 | * | 7/2001 | Bittinger et al. ............ 709/224 |
| 6,308,202 | B1 | * | 10/2001 | Cohn et al. .................... 705/27 |
| 6,308,221 | B1 | * | 10/2001 | Perlman et al. ............. 709/241 |
| 6,317,780 | B1 | * | 11/2001 | Cohn et al. ................. 709/217 |
| 6,317,791 | B1 | * | 11/2001 | Cohn et al. ................. 709/227 |
| 6,389,475 | B1 | * | 5/2002 | Speakman et al. .......... 709/232 |
| 6,457,025 | B2 | * | 9/2002 | Judson .................... 707/501.1 |
| 2002/0002568 | A1 | * | 1/2002 | Judson ........................ 705/27 |

OTHER PUBLICATIONS

Berners et al., "Universal Resource Identifiers in WWW" (RFC 1630), 6/94, W3.org. 25 pages.*

FGDC, "Details of instructions for preparing a Data description using the NOAA FGDC Meta data standard template", Jun. 8, 1994, U.S. Geological Survey National Center, 2 pages.

Berners et al., "Universal Resource Identifiers in WWW" (RFC 1630), 6/94, W3.org, 25 pgs.

Jupiter, "Content's Manifest Destiny," Dec. 1997, pp. 2.

Microsoft unveils advertising, "Electronic Market Place Report," Aug. 1995, v9, n15, p. 1.

Taylor, Cathy "Going Beyond the Banner," Jul. 1996, pp. 36–41.

"Monitoring Corporate Info. with First Floor Products," First Floor Inc. 1996.

Fortanet et al., "Netvertising: Content–Based Subgeneric Variations in a Digital Genre," IEEE, 1998, pp. 10.

Monticino, "Web–analysis: Stripping away the hype," Dec. 1998, v31, n12, pp. 3.

Mcarthur, "World Wide Web & HTML," Dr. Dobb's, Journal, Dec. 1994.

* cited by examiner

SYSTEM FOR TARGETING INFORMATION TO SPECIFIC USERS ON A COMPUTER NETWORK

RELATED APPLICATIONS

This application is a continuation of U.S. patent application Ser. No. 09/149,404, filed Sep. 8, 1998, now U.S. Pat. No. 6,308,202 B1, issued Oct. 23, 2001, entitled, "System for Targeting Infonmation to Specific Users on a Computer Network," which is a continuation-in-part of U.S. application Ser. No. 09/107,651, filed Jun. 30, 1998, now U.S. Pat. No. 6,237,039, issued on May 22, 2001, entitled, "Method and Apparatus for Downloading Auxiliary Data to a Client From a Network During Client Idle Periods," which is hereby incorporated by reference.

TECHNICAL FIELD

The present invention relates to targeting information to specific users of a computer network and more particularly to a system for transmitting information to users viewing selected content on a computer network.

BACKGROUND OF THE INVENTION

In recent years, the popularity of computer networks such as the Internet have dramatically increased. Though relatively unknown at first, the growth of the Internet has fed upon itself. As the quantity and variety of information available on the Internet grew, more people sought access. Meanwhile, as more people began accessing the Internet, more individuals, groups, businesses, governments, etc. began to compete for the attention of this growing audience by creating files, or "websites," accessible on the Internet. As a result, millions of people access the Internet each day. Moreover, the Internet continues to grow as more people gain access and new uses for the Internet are developed.

Establishing a physical communications link to the Internet is one of the first tasks a person, or "user," must accomplish before being able to access the content available over the Internet. However, the Internet is essentially a large number of computer servers connected together through high-speed, high capacity communications lines sometimes called "backbones." Because the hardware and software necessary to achieve a direct connection to the Internet are complex and costly, most users gain access to the Internet through a third-party.

There are currently many entities providing access to the Internet through their direct connection. One example is known as an "On-Line Service" (OLS). In addition to providing access to the Internet, an OLS will usually also offer unique information and.services to its "subscribers" that is not otherwise available on the Internet (or is only available to a user for an additional fee). A more common example is known as an "Internet Service Provider" (ISP). An ISP only provides its subscribers with access to the Internet (and perhaps related services such as e-mail, and personal websites). An ISP typically does not provide additional content beyond what is available over the Internet.

Another entity providing access to the Internet is the WEBTV® Internet access network. (WEBTV is a registered trademark of WEBTV Networks, Inc. of Mountain View, Calif.) Unlike most OLS's and ISP's which require a user to own a personal computer, the WEBTV system only requires the user to own an ordinary television. WEBTV Networks, Inc. provides the additional hardware and software necessary for the user to access the Internet and display websites on his or her television. WEBTV subscribers gain access to the Internet through a WEBTV Internet Server which has a direct connection to the Internet. The WEBTV Internet Server also offers supplemental services, such as email, news reports, television program guides and enhanced access to certain websites.

Regardless of the type of entity providing Internet access, each must recoup the high costs of installing and continually upgrading its server hardware and software. While most entities charge subscribers a fee for the service, heated competition has forced many to lower subscription fees and seek other sources of revenue. One such revenue source is advertising. However, given the vast array of advertising mediums such as television, radio, newspapers, magazines, etc., competition for advertising can be just as strong as competition for subscribers. Therefore, many entities providing Internet access have searched for ways to offer advertisers a choice of marketing tools that are unique to the Internet.

One such marketing tool can be described as targeted advertising. Targeted advertising allows an advertiser to direct a message to particular users rather than to all users or a random subset of all users. Perhaps the most basic targeting method involves transmitting messages to all users who access a particular website. Typically, the advertiser pays the owner of the web site to place an advertisement within the content of the website. When a user displays the targeted website, the advertisement is also displayed. However, this targeting method is very inefficient since the advertiser must negotiate with a large number of website owners to get broad coverage.

Another method of targeted advertising involves transmitting messages to users based on their personal interests as disclosed in a questionnaire. Thus, for example, a user who indicates that he or she is interested in camping might receive an advertisement for camping equipment. However, it is often difficult to induce users to provide the necessary information. Moreover, most users will have a wide variety of more transitory interests which no reasonable questionnaire can track.

Yet another method of targeted advertising involves transmitting messages to users who input selected keywords in Internet search engines. An Internet search engine is essentially a program accessible over the Internet which searches a large database of websites for keyword(s) that are entered by the user. The search engine will typically return a list of websites which contain the keyword. The user can then download the content of one or more of the websites located by the search engine.

Unfortunately, targeting to keyword searches will never reach users who do not use the search engines. Moreover, since different users will likely use many different keywords to search for the same content, an advertiser is unlikely to be able to target all possible keywords. For example, an auto manufacturer who wanted to reach all users interested in automobiles might have to target the following keywords: auto, automobile, car, truck, van, sport utility vehicle, hot rod, convertible, station wagon, etc. In addition to the various subject-matter keywords, that same auto manufacturer would likely also have to target all the individual manufacturers and car models to reach its intended audience. Thus, it is virtually impossible to anticipate all the possible keywords that could be entered by a user interested in automobiles.

SUMMARY OF THE INVENTION

The present invention includes a system for targeting advertising on a computer network such as the Internet. The system involves categorizing a plurality of Internet address pointers according to the content designated by the address pointer. The address pointer identified by the user is then read and a determination is made as to whether the address pointer has been categorized. If the address pointer has been categorized, the category or categories of the address pointer is determined. Information packets, such as advertisements, are targeted to selected categories. Once the category of an address pointer has been determined, an information packet targeted to that category is selected and transmitted to the user.

DETAILED DESCRIPTION OF THE INVENTION

Figure 1:
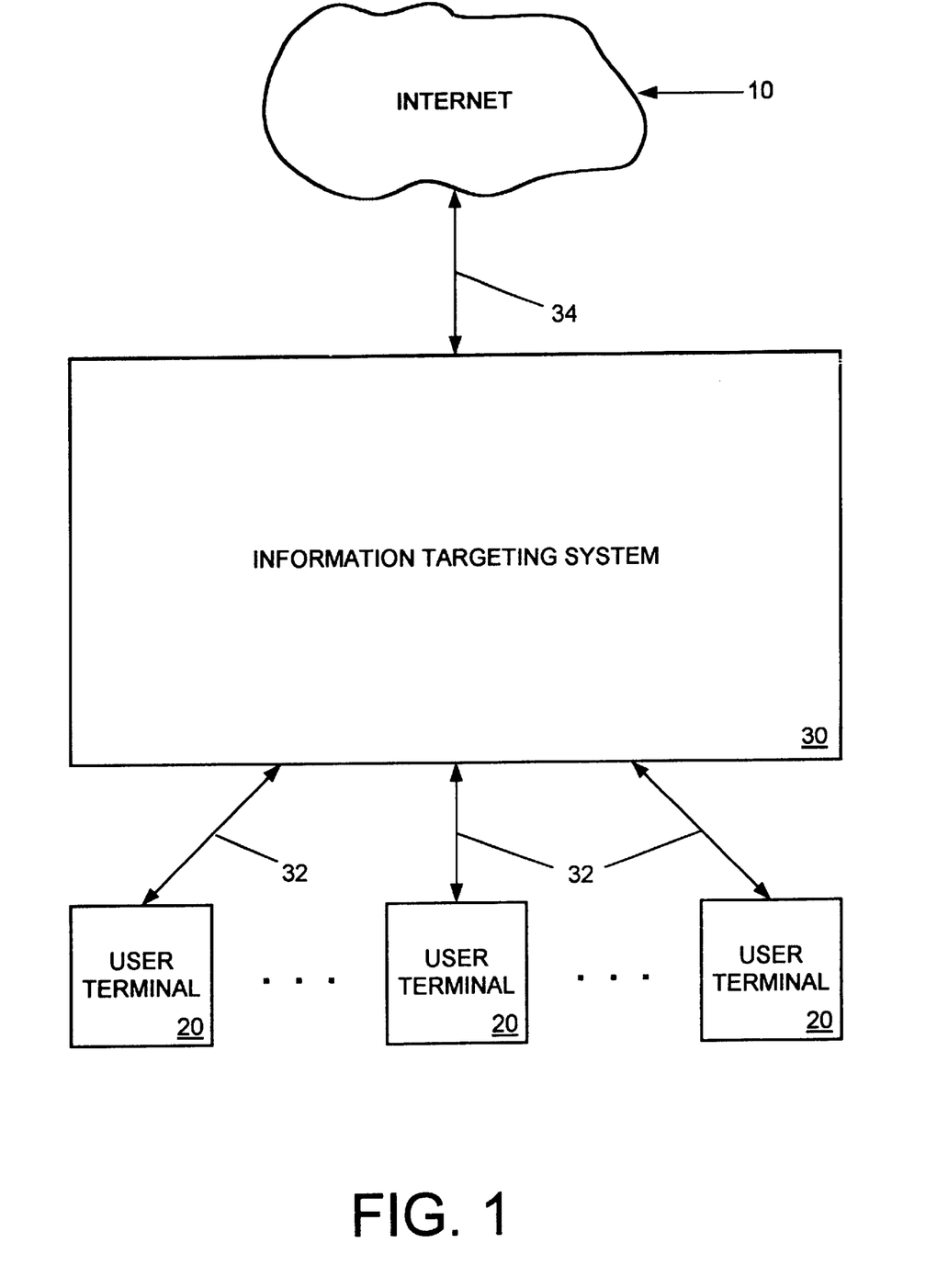
FIG. 1 is a schematic view of a system for targeting information to users according to the present invention.

A system for targeting information to a user receiving identified content on a computer network according to the present invention is shown generally at 30 in FIG. 1. System 30 is connected to a computer network 10 (e.g., the Internet) and to at least one user terminal 20. Terminal 20 is configured to receive content available on computer network 10, such as data files, etc. System 30 typically is connected to the Internet via a high-speed, high-capacity communications line 34 such as a T1 or fiber optic cable. System 30 thus operates as an access point for, and communications link between, user terminal 20 and the Internet 10. Although communications line 32 is typically a plain old telephone service (POTS) line, other well known alternatives, such as Integrated Services Digital Network (ISDN) connections, are also suitable.

Figure 2:
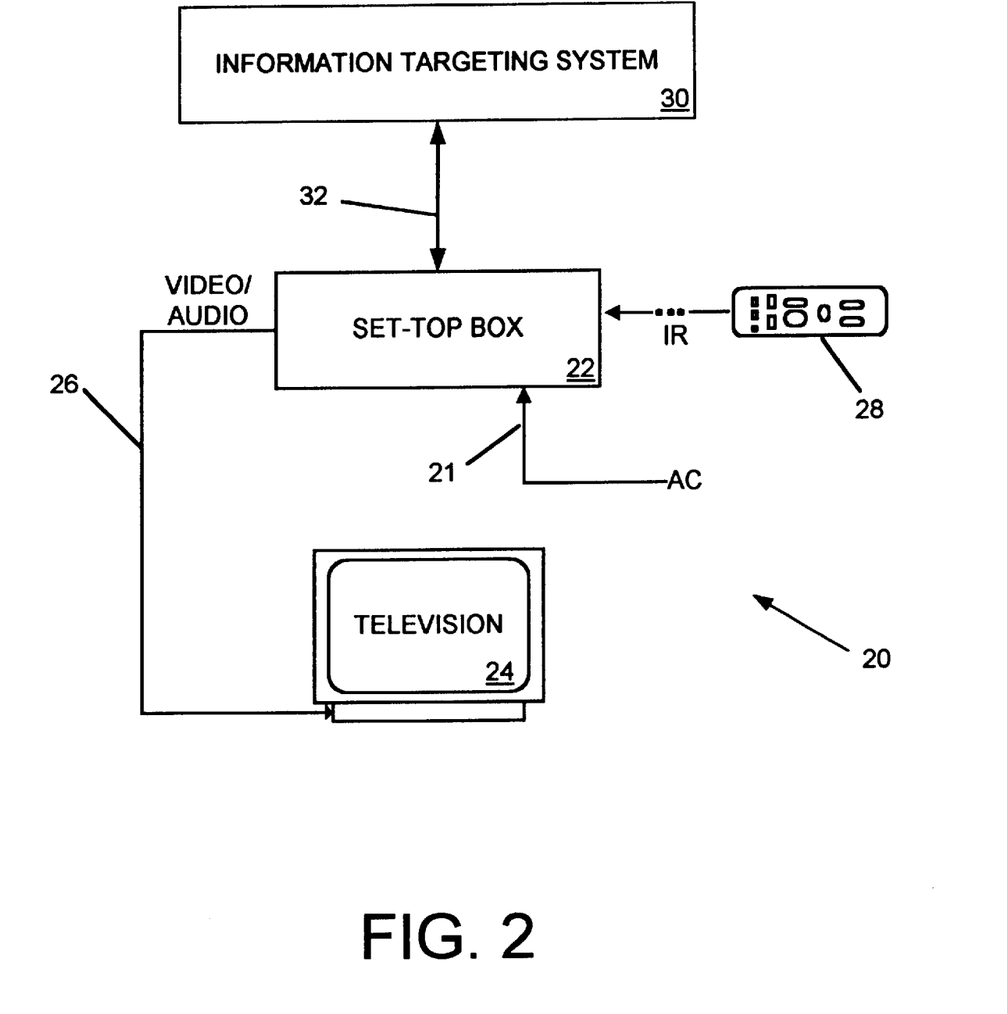
FIG. 2 is a schematic view of a user terminal configured for use as part of the present invention.

In the disclosed embodiment, user terminal 20 is a WEBTV Internet terminal. As shown in FIG. 2, terminal 20 includes an electronics unit 22 (hereinafter referred to as "set-top box" 22 because it is often positioned on the top of a television set), an ordinary television set 24, and a remote control 28. Alternatively, set-top box 22 may be built into television set 24 as an integral unit.

The user terminal employs television set 24 as a display device for displaying video and audio data, and as a graphical user interface. The set-top box is coupled to the television set by a video and audio link 26. Link 26 is an RF (radio frequency), S-video, composite video, or other equivalent link. Set-top box 22 includes hardware and/or software to cause a graphical user interface to be displayed on television 24, by which the user can access various Internet system network services, browse the Web, send email, and otherwise access the Internet.

User terminal 20 may include a standard modem and/or an ISDN modem, so that line 32, between user terminal 20 and system 30, can be either a POTS line or an ISDN line. In the depicted embodiment, both a standard modem and an ISDN modem are included in set-top box 22. The set-top box receives power through a power line 21.

Remote control 28 acts as an input device and is operated by the user to control the user terminal while browsing the Web, sending email, and performing other Internet-related functions, as well as to control television viewing. The set-top box receives commands from remote control 28 via an infrared (IR) communication link. In alternative embodiments, the link between the remote control and the set-top box may be RF or any equivalent mode of transmission (e.g., wires, etc.).

Although user terminal 20 is described above in the context of a WEBTV Internet terminal, it will be appreciated that there are a number of other suitable contexts which are within the scope of the invention. One such context is a personal computer including a monitor or other graphics display device and a modem, where the computer is configured to run an Internet navigating program. In such a context, the computer monitor functions like television 24 of the WEBTV Internet terminal while the computer functions like set-top box 22 when the computer is running the Internet navigating program. Additionally, the computer will include a keyboard, mouse or other input device which functions like remote control 28.

In any event, a user wishing to receive content available on computer network 10, operates user terminal 20 to create a communications connection to system 30 via line 32. System 30 is capable of independently communicating with a plurality of user terminals and acting as a communications link to transmit content available on computer network 10 to each user's terminal as requested by the user. Once the communications connection to system 30 has been established, the user operates user terminal 20 to display the specific content the user is interested in. The user typically displays specific content by operating his or her user terminal to identify an address pointer which designates the location of the specific content on the computer network. In the disclosed embodiment, the user selects or identifies the address pointer using remote control 28. The remote control then communicates this identification to set-top box 22 which communicates with system 30 to locate and receive the content designated by the address pointer which the user identified. The method by which the content is located on the Internet and received by the user terminal is discussed in more detail below.

Where the computer network is the Internet, the user identifies the Internet address pointer of the website whose content the user wishes to view. (The Internet address pointer is hereinafter referred to as a Uniform Resource Locator (URL), which is the current protocol for designating content on the Internet.) User terminal 20 then communicates this identification to system 30 via line 32, whereupon the system locates the identified website via line 34, retrieves the desired content from memory or from a website, and transmits the content of the website to user terminal 20. By repeating this process, a user can move among—or "browse"—the content of a variety of websites available on the Internet.

In addition to acting as an access point and communications link, system 30 also may operate to target specific categories of content, and to transmit or display additional information to a user who identifies the address pointer of such content. To achieve this function, system 30 categorizes the content, or portions of the content on network 10 into a plurality of categories which are defined by the operator of the system according to selected characteristics. For example, content might be categorized according to its subject matter: sports, news, art, history, finance, etc. Alternatively, content may be categorized according to the age of users likely to access the content, one or more words contained in the content, or the language of the content. Additionally, it will be appreciated that certain content may be within a plurality of categories. For example, content discussing a recent sporting event may be within both the sports and news categories.

System 30 includes a database of at least one, but preferably a plurality, of Internet URLs which have been categorized according to the subject matter of the websites addressed by the URLs. Thus, for example, under the category of "sports," the database might include URLs which designate websites containing professional sports scores, still pictures of local sporting events, an Internet "chat room" hosted by athletes, the homepage of a tennis shoe manufacturer, and research papers involving treatment of sports injuries, to name just a few. Furthermore, this database is not necessarily static, but can be modified by adding URLs or re-categorizing the URLs under different categories.

Once a database of categorized URLs is established, system 30 determines the category of the identified website via the user terminal. As discussed in more detail below, system 30 determines the category of the identified website by reading the URL identified by the user and searching the database to determine the category, if any, of the URL. System 30 typically accomplishes this reading step without interrupting or delaying the transmission, or "download," of the website addressed.

In addition to determining the category of the identified website, system 30 also connects or targets a specific piece of additional information, (hereinafter referred to as an "information packet"), to at least one predetermined category. Thus, if the identified website is within the targeted category, an information packet that has been targeted to that category is then transmitted to the user terminal for display to the user. It will be appreciated that the information packet need not be transmitted or displayed while the user is viewing the website, but may be transmitted or displayed interstitially, upon accessing a subsequent website. Furthermore, system 30 is typically capable of targeting a plurality of information packets and selecting among several information packets which are targeted for the same category.

Figure 3:
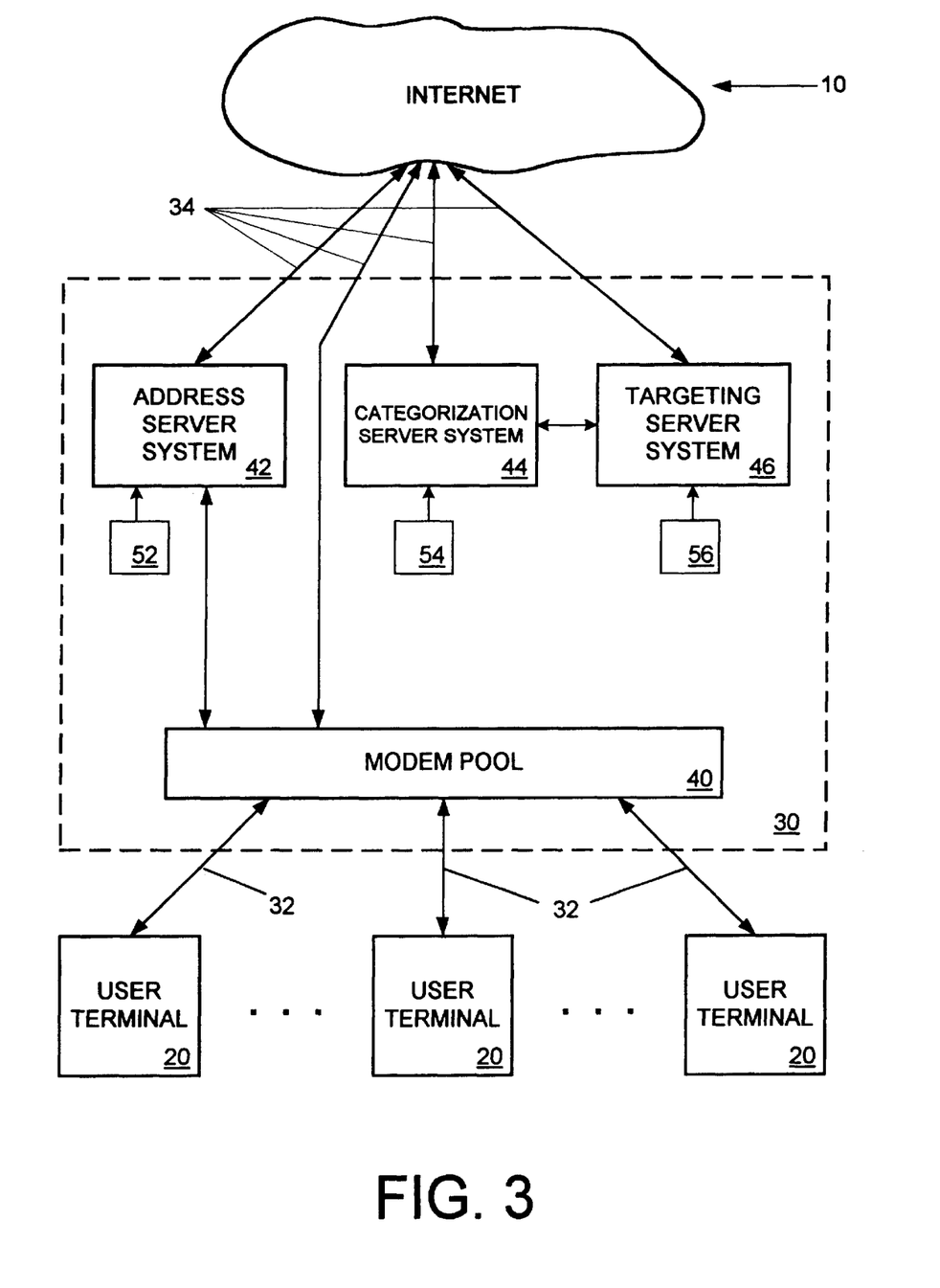
FIG. 3 is a schematic view of the architecture of a disclosed embodiment of an information targeting system.

FIG. 3 illustrates information targeting system 30 in greater detail. As shown in FIG. 3, system 30 includes a modem pool 40, an address server system 42, a categorization server system 44, and a targeting server system 46. Each server system 42, 44 and 46, is configured to access a database 52, 54 and 56, respectively, which will be discussed in more detail below. User terminals 20 are connected to communicate with modem pool 40 via direct-dial, bidirectional communications lines 32, which may be POTS lines, ISDN lines, or any other similar type of connection, such as cable and satellite forward channels. In any event, modem pool 40 is connected to communicate through address server system 42 with a number of remote servers (not shown) via the Internet. Note that modem pool 40 is a conventional modem pool, such as those found today throughout the world providing access to the Internet and private networks.

Address server system 42 is configured to read the URL which designates the identified website and to determine whether the URL has been categorized. Address server system 42 is a WEBTV network server system which specifically supports user terminal 20. Address server system 42 is configured to access address database 52 which contains a list of all URLs that have been categorized.

Address server system 42 acts as the communications link between user terminal 20 and the Internet by reading the URL of the identified website, locating the identified website designated by the URL, and retrieving a copy of the content from the identified website. Address server system 42 then transmits the content to the user terminal via modem pool 40. Additionally, upon reading a URL identified by the user, address server system 42 searches address database 52 to determine whether the URL is categorized. The result of that search is communicated to categorization server system 44.

In the disclosed embodiment, address server system 42 communicates with categorization server system 44 via user terminal 20. If the address server system determines that the URL identified by the user is a categorized URL, the address server system returns a signal to the user terminal that the URL is categorized. Upon receipt of this signal, the user terminal links to categorization server system 44 via modem pool 40 and the Internet, and informs the categorization server system that a categorized URL is being received.

Although not necessary to this invention, the above described communications link between the address and categorization server systems allows user terminal 20, and more specifically, set-top box 22, to control when it is available to receive targeted information. Alternatively, the address server system and categorization server system might be connected to communicate directly or via the Internet. As a further alternative, the functions of the address server system and the categorization server system might be combined into a single server system.

Categorization server system 44 is configured to determine what category or categories the URL is within. Preferably, but not necessarily, categorization server system 44 is configured to access category database 54 which contains a list of all categorized URLs grouped by category. Categorization server system 44, upon receiving a URL, searches category database 54 to determine which category or categories the URL is within. The category database may be supplied by a third-party such as Excite, Inc. of Redwood City, Calif.

The disclosed embodiment also includes targeting server system 46 which is connected to communicate with categorization server system 44, and configured to target an information packet to at least one category of URLs. Preferably, though not necessarily, targeting server system 46 is configured to access target database 56 which contains a plurality of information packets, each targeted to one or more categories. The targeting server system may be connected to the categorization server system either directly or via the Internet.

In any event, categorization server system 44 communicates the category or categories of the URL to targeting server system 46. The targeting server system then searches target database 56 to determine which information packet(s) are targeted to that category. If an information packet targeted to that category is found, the information packet is then transmitted to user terminal 20 via modem pool 40. Preferably, though not necessarily, the information packet is then displayed to the user on display device 24.

In the event that a plurality of information packets are targeted to the same category, targeting server system 46 is configured to select the most appropriate information packet for transmission based on criteria programmed into targeting server system 46. For example, the targeting server system might be programmed to record the frequency that each information packet is transmitted and, for the next transmission based on a particular category, select the information packet which has been transmitted least often. Obviously, many other criteria are possible. The "Ad Manager," manufactured by Accipiter, Inc. of Raleigh, N.C., is one example of a suitable targeting server system.

While system 30 has been described above to include three distinct server Systems, each configured to access a distinct database, it will be appreciated that other embodiments are possible and, thus, within the scope of the invention. For example, a single server system could perform the functions of two, or even all three of the distinct server systems. Furthermore, the databases may be incorporated within, or remote to, the respective server system. Additionally, the server systems may comprise either one or a plurality of computer systems configured to operate according to the invention.

Figure 4:
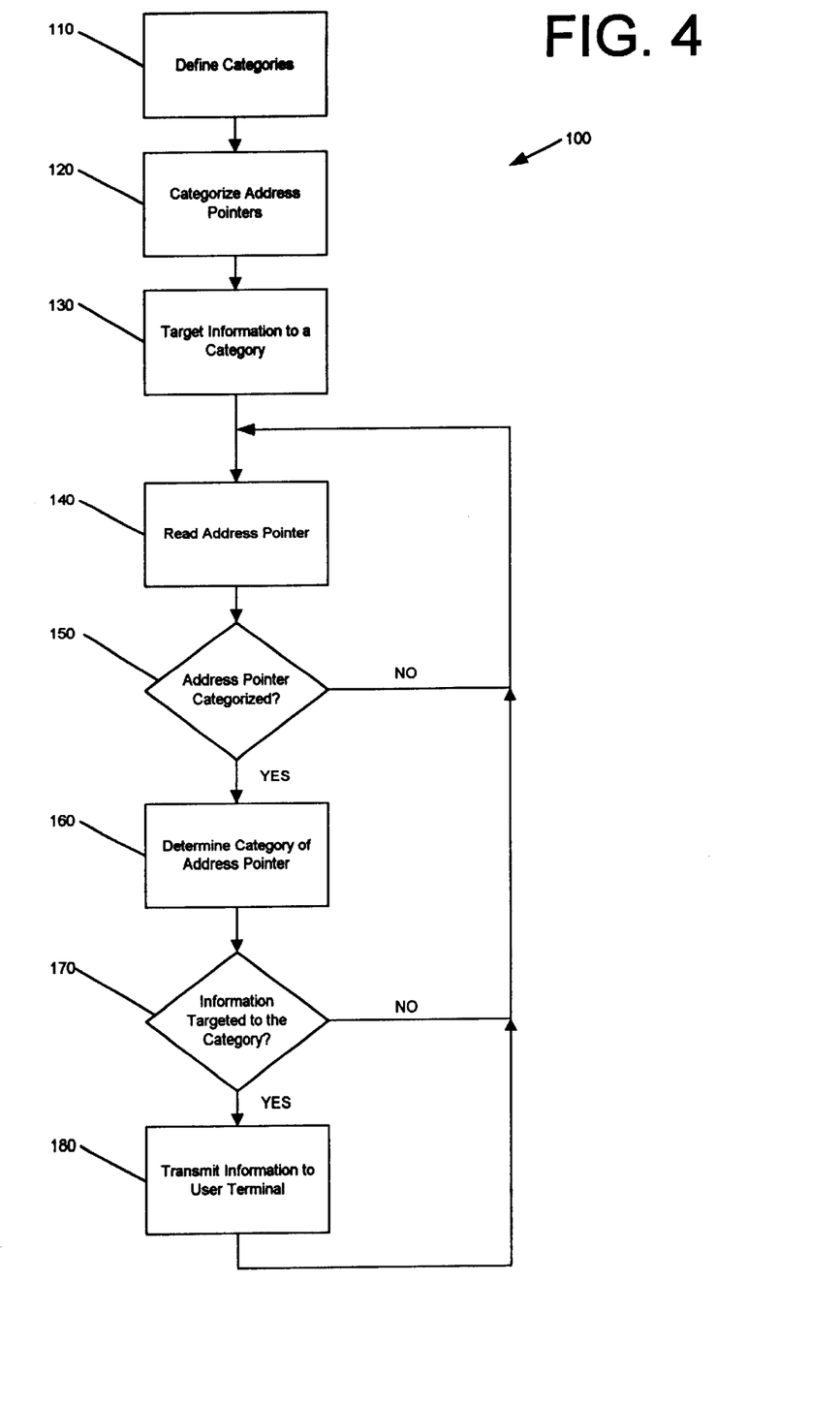
FIG. 4 is a flowchart illustrating a method for targeting information to a user on a computer network.

Using system 30, a method of targeting additional information to a user viewing an Internet website according to the content of the website is shown generally at 100 in FIG. 4. As indicated at 110, the operator of the system first defines a plurality of categories according to selected characteristics. At step 120, system 30 then categorizes at least one URL into at least one of the categories according to the content of the website designated by the URL. Subsequently at step 130, additional information packets, such as advertisements, are then targeted to at least one category, hereinafter referred to as the "targeted category."

As shown at 140, the system reads the URL which designates the website the user is viewing. At step 150, the system determines whether the URL just read is a categorized URL. In the disclosed embodiment, the system searches the address database for the URL. If the URL just read is not categorized, system 30 returns to step 140 and reads the URL of the next website viewed by the user. Alternatively, if the URL is a categorized URL, the system continues to step 160 and determines the category of the URL. In the disclosed embodiment, the system searches the category database for the category of the URL.

As shown at 170, system 30 then transmits the additional information packet to the user if the category of the URL is the targeted category. The transmission may occur while the user is still viewing the website or may occur at a later time. Once the additional information is transmitted to the user terminal, system 30 can then return to step 140 so that, as the user identifies a new website for viewing, the system can read the URL which designates that new website. By repeating this process, the operator of the system can target additional information which is relevant to the user's changing interests as revealed by the content of the various web sites the user is viewing.

Figure 5:
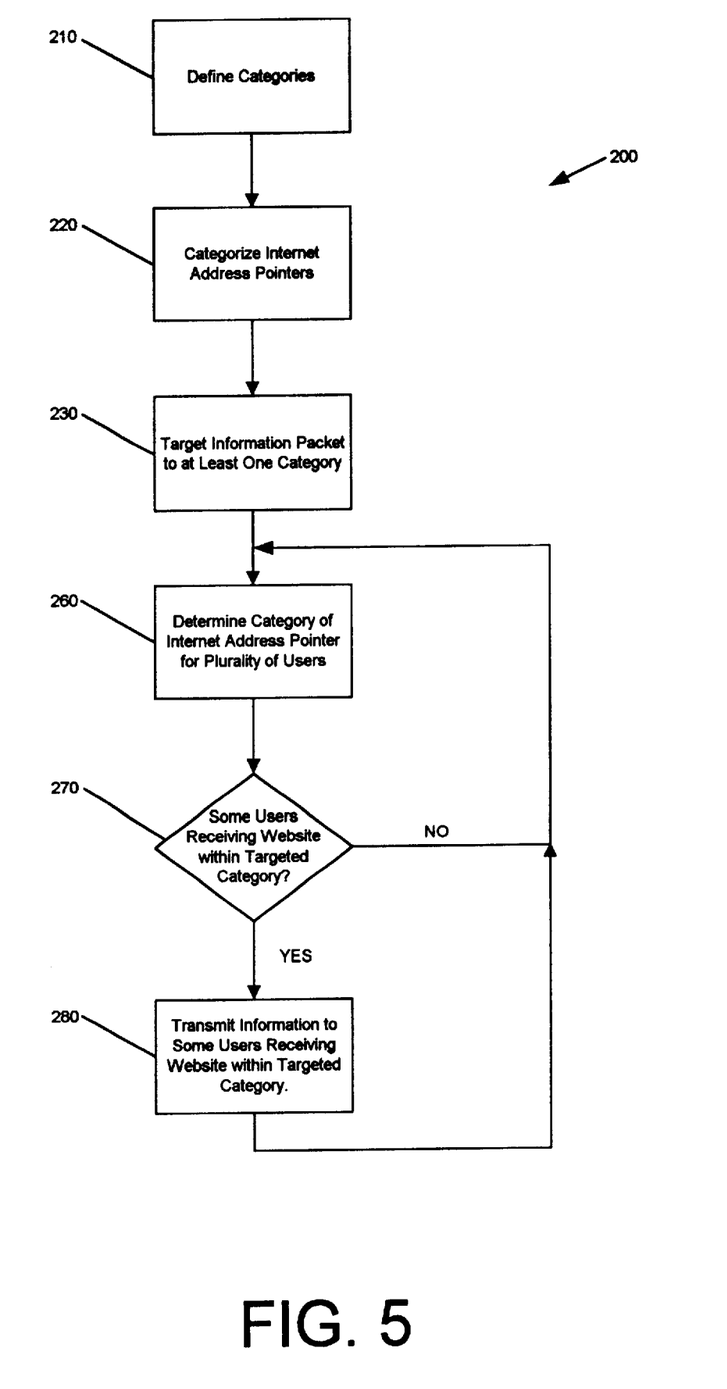
FIG. 5 is a flowchart illustrating a method for targeting an information packet to users receiving a group of Internet web sites.

As shown generally at 200 in FIG. 5, system 30 also allows an information provider, such as an advertiser, to transmit additional information to a plurality of users receiving a group of Internet websites where the websites are grouped based on the subject matter of the content of the websites. As indicated at 210, the operator of the system first defines a plurality of categories according to selected characteristics. At step 220, system 30 then categorizes a plurality of URLs into at least one of the categories according to the subject matter of the content of the website designated by the URL. Subsequently at step 130, additional information packets, such as advertisements, are then targeted to at least one category, hereinafter referred to as the "targeted category."

As shown at 260, system 30 then determines, for each of a plurality of users, the category of the URL that designates the website the user is viewing. In the disclosed embodiment, the system searches the address database for each URL. If a URL is found in the address database, the system searches the category database for the category of that URL.

As indicated at step 270, if none of the users are viewing a website within the targeted category, the system will return to step 260 to determine the categories of URLs subsequently identified by the users. Alternatively, if some of the users are viewing websites within the targeted category, the system will transmit the additional information packet to at least some of those users. The transmissions may occur while the users are still viewing the websites or may occur at a later time.

As described above, system 30 allows an information provider, such as an advertiser, to transmit additional information to a large plurality of users who browse distinct, but related, websites on the Internet. Furthermore, system 30 allows this transmission to occur relatively quickly after the user identifies a website because the system reads the URL of the website which the user is currently receiving. Thus, an advertiser is able to transmit an advertisement to the user while the user is pursuing a particular topic targeted by the advertiser.

For example, a user browsing the website of an on-line bookstore might receive an advertisement for a publisher's latest science-fiction bestseller. Moreover, the same advertisement might also be targeted to all other URLs in the same category, such as URLs designating websites for on-line reading groups, book reviews, and space flight. Finally, this process can be repeated for a plurality of URLs so that if the user's interest changes and he or she then identifies a website showing local weather, system 30 might respond by transmitting an advertisement for suntan lotion or snow skis.

It will be appreciated that the invention disclosed above may be practiced with many variations to further enhance the effectiveness of the invention. A few such variations are disclosed in co-pending U.S. applications: "System and Method for Distributing Data over a Communications Network," Ser. No. 09/149,407 filed Sep. 8, 1998, by inventors Timo Bruck, Stephen G. Perlman and Alan Cohn; "System and Method for Distributing Video Data over a Communications Network," Ser. No. 09/149,405, filed Sep. 8, 1998, by inventors Timo Bruck, Stephen G. Perlman and Alan Cohn; "System and Method for Distributing User-Preferenced Data over a Communications Network," Ser. No. 09/268,239, filed Mar. 15, 1999, by inventors Timo Bruck, Alan Cohn, Wei Huang, Eric Tucker, Thomas Scott and Bruce Leak; and "System and Method for Controlling Delivery of Content over a Communications Network," Ser. No. 09/149,410, filed Sep. 8, 1998, by inventors Timo Bruck and Alan Cohn, the disclosures of which are all herein incorporated by reference.

While the invention has been disclosed in its preferred form, the specific embodiments thereof as disclosed and illustrated herein are not to be considered in a limiting sense as numerous variations are possible. Applicant regards the subject matter of his invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower or equal in scope to the original claims.

What is claimed is:

1. In a computer network that includes a plurality of servers and at least one user terminal logically connected to the computer network through a targeting information system that operates as an access point to the computer network by directing requests for content from the at least one user terminal to one or more servers providing the content that the at least one user terminal requests, a method of targeting one or more information packets for download to a user terminal, wherein the targeting is independent of the user terminal requesting content from any particular server, and wherein the targeting is based on content requested by the user terminal, the method comprising steps for:

the targeting information system accessing a target database, the target database including one or more information packets that are targeted to at least a first content category;

automatically, without user intervention, and independent of the user terminal requesting content from any particular server, the targeting information system obtaining one or more particular content addresses, wherein the particular one or more content addresses have been requested by the user terminal and correspond to content provided by one or more servers; and if the particular one or more content addresses which have been requested by the user terminal are associated with the first content category, the targeting information system delivering the one or more information packets to the user terminal.

2. A method as recited in claim 1, wherein a third party categorization database is used to determine whether the first content category is associated with the one or more content addresses.

3. A method as recited in claim 1, wherein the targeting information system connects the plurality of servers and the computer network through the Internet.

4. A method as recited in claim 1, further including an act of displaying the one or more information packets at the user terminal.

5. A method as recited in claim 1, wherein at least one of the one or more particular content addresses is associated with a the first content category based on one or more words within the first content category that is available at the at least one of the one or more particular content addresses.

6. A method as recited in claim 1, wherein the one or more information packets are targeted to at least a first content category by a third party.

7. A method as recited in claim 6, wherein the target database is remotely located from the target information system.

8. A computer program product for use in a computer network that includes a plurality of servers and at least one user terminal logically connected to the computer network through a targeting information system that operates as an access point to the computer network by directing requests for content from the at least one user terminal to one or more servers providing the content that the at least one user terminal requests, the computer program product comprising:

one or more computer-readable media having computer-executable instructions for implementing a method of targeting one or more information packets for download to a user terminal, wherein the targeting is independent of the user terminal requesting content from ally particular server, and wherein the targeting is based on content requested by the user terminal, the method comprising:

the targeting information system accessing a target database, the target database including one or more information packets that are targeted to at least a first content category;

automatically, without user intervention, and independent of the user terminal requesting content from any particular server, the targeting information system obtaining one or more particular content addresses, wherein the particular one or more content addresses have been requested by the user terminal and correspond to content provided by one or more servers; and if the particular one or more content addresses which have been requested by the user terminal are associated with the first content category, the targeting information system delivering the one or more information packets to the user terminal.

9. A computer program product as recited in claim 8, wherein a third party categorization database is used to determine whether the first content category is associated with the one or more content addresses.

10. A computer program product as recited in claim 8, wherein the targeting system connects the plurality of servers and the computer network through the Internet.

11. A computer program product as recited in claim 8, further including an act of displaying the one or more information packets at the user terminal.

12. A computer program product as recited in claim 8, wherein at least one of the one or more particular content addresses is associated with the first content category based on one or more words within the first content category that is available at the at least one of the one or more particular content addresses.

13. A computer program product as recited in claim 8, wherein the one or more information packets are targeted to at least a first content category by a third party.

14. A computer program product as recited in claim 13, wherein the target remotely located from the target information system.

* * * * *

UNITED STATES PATENT AND TRADEMARK OFFICE
CERTIFICATE OF CORRECTION

PATENT NO.    : 6,606,652 B1
DATED         : August 12, 2003
INVENTOR(S)   : Cohn et al.

It is certified that error appears in the above-identified patent and that said Letters Patent is hereby corrected as shown below:

<u>Column 8,</u>
Line 57, after "are possible." please delete "Applicant regards" and insert -- Applicants regard --.
Line 58, after "matter of" please delete "his" and insert -- their --

<u>Column 9,</u>
Line 2, after "matter of" please delete "applicants's" and insert -- applicants' --
Line 46, after "with" please delete "a"

<u>Column 10,</u>
Line 38, after "wherein the" please insert -- information --
Line 53, after "the target" please insert -- database is --.

Signed and Sealed this

First Day of June, 2004

JON W. DUDAS
*Acting Director of the United States Patent and Trademark Office*